United States Patent [19]
Smeets

[11] Patent Number: 5,864,491
[45] Date of Patent: Jan. 26, 1999

[54] APPARATUS AND ASSOCIATED METHOD FOR GENERATING A PSEUDO RANDOM NUMBER

[75] Inventor: Ben J. M. Smeets, Dalby, Sweden

[73] Assignee: Telefonaktiebolaget L M Ericsson, Sweden

[21] Appl. No.: 966,820

[22] Filed: Nov. 10, 1997

[51] Int. Cl.$^6$ .............................. G06F 1/02; H04L 9/02
[52] U.S. Cl. .............................. 364/717.01; 364/717.07; 380/46
[58] Field of Search .......................... 364/717.01, 717.03, 364/717.07; 380/46

[56] References Cited

U.S. PATENT DOCUMENTS

| | | | |
|---|---|---|---|
| 3,925,612 | 12/1975 | Guanella et al. | 178/22 |
| 4,797,922 | 1/1989 | Massey et al. | 380/46 |
| 5,046,036 | 9/1991 | Tezuka | 364/717 |
| 5,148,485 | 9/1992 | Dent | 380/46 |

OTHER PUBLICATIONS

T. Siegenthaler; *Design of Combiners to Prevent Divide and Conquer Attacks*; Advances in Cryptology Conference, Santa Barbara, California; Aug. 18–22, 1985; pp. 273–279.

*Primary Examiner*—Tan V. Mai
*Attorney, Agent, or Firm*—Jenkens & Gilchrist P.C.

[57] ABSTRACT

A pseudo-random number generator, and an associated method, generates a pseudo-random number. The pseudo-random number is a complex, linear combination of values of input sequences provided to the generator and exhibits little correlation with such input values. The generator includes a summation combiner and an IIR (infinite impulse response) filter connected in a feedback connection with the summation combiner. Because of the low correlation of the pseudo-random number and input values provided to the generator, the pseudo-random number is less susceptible to cryptanalysis by an unauthorized party.

18 Claims, 4 Drawing Sheets

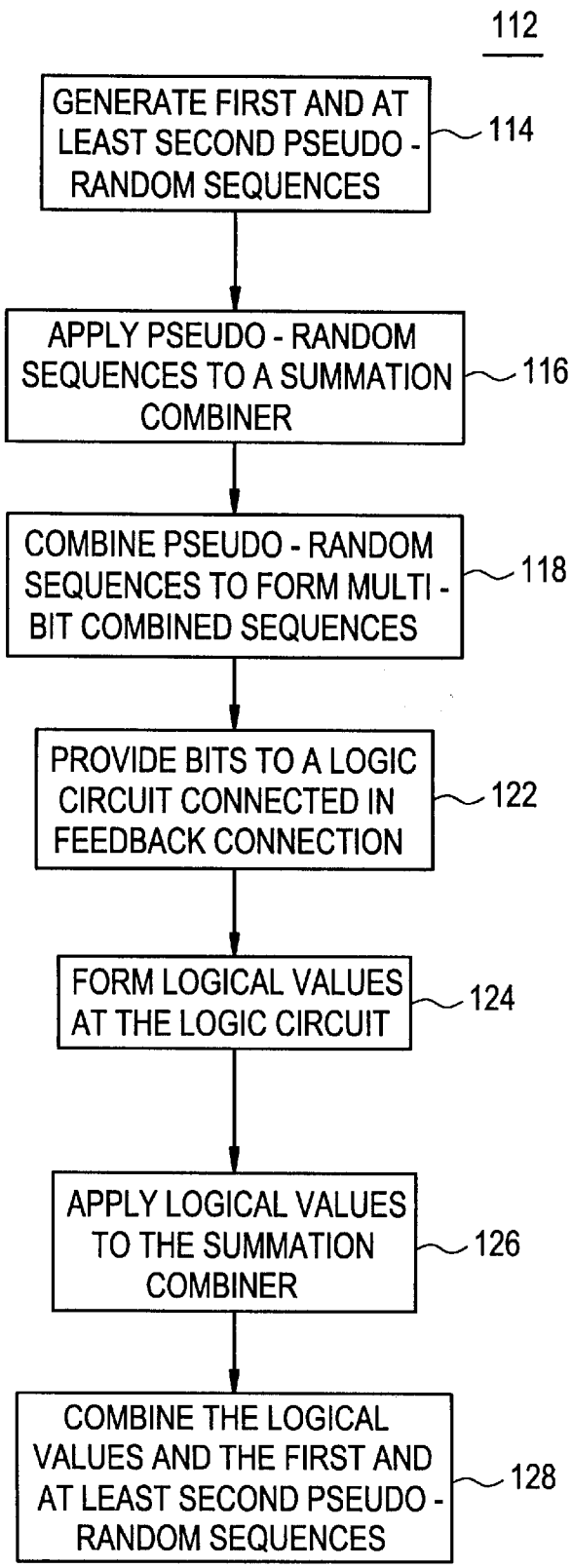

APPARATUS AND ASSOCIATED METHOD FOR GENERATING A PSEUDO RANDOM NUMBER

The present invention relates generally to the coding of an information signal, such as a downlink or uplink signal generated during operation of a cellular communication system. More particularly, the present invention relates to apparatus, and an associated method, for generating a pseudo-random number.

A pseudo-random number generated during operation of an embodiment of the present invention is used, inter alia, in the formation of an encrypted signal. The encrypted signal is substantially uncorrelated to combinations of input signals used in the formation of the pseudo-random number, thereby making decoding of the encrypted signal by an unauthorized party through cryptanalysis difficult.

Privacy of communications can be better assured so that only authorized parties are able to de-encrypt an encrypted signal. Because of a low correlation between an output signal generated responsive to input signals applied to the pseudo-random number generator, the output signal is not amenable to cryptanalysis.

In one embodiment of the present invention, an IIR (infinite impulse response) filter is connected in a feedback relationship with a summation combiner. Signals generated by the IIR are combined with sequences generated by linear feedback shift registers. The combined signal forms a pseudo-random number which is substantially uncorrelated with the input sequences. The pseudo-random number generated in this manner is used to encrypt an information signal which is difficult to de-encrypt by an unauthorized party by a cryptanalysis technique.

BACKGROUND OF THE INVENTION

A communication system is formed, at a minimum, by a transmitter and a receiver interconnected by a communication channel. The transmitter forms at least a portion of a sending station, and the receiver forms at least a portion of a receiving station. Information to be communicated by the transmitter to the receiver is modulated to form communication signals. The communication signals generated and transmitted by the sending station are transmitted upon the communication channel to be received by the receiving station. Information contained in the communication signals transmitted by the sending station is recovered once received at the receiving station. In a digital communication system, information to be communicated to the receiving station is digitized. The digitized information is then used to form the communication signal.

A radio communication system is a type of communication system in which the communication channel is formed of a radio channel defined upon a portion of the electromagnetic spectrum. Because a fixed connection is not required to form the communication channel between a sending and receiving station, communications are possible when a fixed connection between the sending an receiving station is impractical. However, radio channels are inherently public in nature. That is to say, a communication signal transmitted upon a radio communication channel can be detected by any receiving station tuned to the radio channel. An unauthorized party, for instance, is able to tune a radio receiver to the frequency of the radio channel upon which the communication signal is transmitted, thereby to receive the communication signal.

Privacy of communications effectuated in a radio communication system are difficult to assure due to the public nature of a radio communication channel. To increase the privacy of communications in such a communication system, cryptographic techniques are utilized to form encoded, or encrypted, signals. In other communication systems, such cryptographic techniques are also utilized to assure better the privacy of communications between a sending and receiving station.

A digital information signal is particularly amenable to be encoded or encrypted. A digital information signal is formed of sequences of bits which are modulated and transmitted during operation of a digital communication system. The bit-wise nature of a digital information signal is particularly amenable to be encoded or encrypted. Each bit, if desired, of which a digital information signal is formed, can be encoded at the sending station. An encoded communication signal is thereby formed which can be transmitted upon the radio communication channel to a receiving station. An unauthorized party having a radio receiver tuned to the radio channel upon which the encoded communication signal is transmitted is unable to decode the signal received thereat without knowledge of the encoding technique by which the encoded signal is formed. Only a receiving station capable of decoding the encoded signal is able to recover the informational content of the encoded signal transmitted upon the communication channel.

Various manners are used by which to encode or otherwise encrypt a digital information signal. A typical encoding scheme, such as that used in cellular communications, utilizes an encryption process by which the bits of an information signal are encoded by combining the bits with pseudo-random sequence generated by a pseudo-random sequence generator. The pseudo-random signal generator is operable in conjunction with a secret key which, in a symmetrical encryption technique, is known to the sending station and to an authorized receiving station. The secret key is used at the authorized receiving station to decode the encoded signal received thereat, thereby to recover the informational content of the transmitted signal.

U.S. Pat. No. 4,797,922 discloses a summation generator which generates a pseudo-random sequence. Such pseudo-random sequence is used in the encryption of data. However, the encoded signal is vulnerable to cryptanalysis, at least when driving inputs applied thereto are linear feedback sequences generated by linear feedback shift registers (LFSRs). Output signals generated by the disclosed apparatus exhibit a correlation with a linear combination of input symbols applied by the LFSRs. For example, when four streams of random bits are provided, a correlation coefficient is of the value of $5/24$. Because of the correlation, observation of a sufficiently long stream of output symbols can permit the recovery of an otherwise-unknown initial state of the LFSRs. Through such observation, therefore, an unauthorized party might be able successfully to recover the informational content of the transmitted signal. Thereby, the privacy of communications would be compromised.

A manner by which to decrease the correlation exhibited by such conventional apparatus would better assure that an encoded signal could not be decoded by an unauthorized party.

It is in light of this background information related to the generation of encoded signals that the significant improvements of the present invention have evolved.

SUMMARY OF THE INVENTION

The present invention, accordingly, advantageously provides apparatus, and an associated method, for generating a pseudo-random number. The pseudo-random number is used, for instance, to encrypt an information signal. The pseudo-random number is formed in a manner such that the encrypted signal is substantially uncorrelated to combinations of input signals used in the formation of the pseudo-random number. Because of the low correlation between the encrypted signal and input signals used to generate the pseudo-random number, the susceptibility to cryptanalysis of the encrypted signal is lessened.

Use of an embodiment of the present invention to encrypt an information signal increases assurances of privacy of communications between a sending station and a receiving station. Because an encrypted signal formed utilizing the pseudo-random number generated during operation of an embodiment of the present invention exhibits little correlation with input signals used in the generation of the pseudo-random number, cryptanalysis of the encrypted signal is unlikely to be successful. Thereby, encrypted signals can be generated on public, or otherwise unsecure, communication channels with lessened concern that an unauthorized party might be able to recover the informational content of the encrypted communication signal.

In one aspect of the present invention, a summation combiner is coupled to receive LFSR (linear feedback shift register) sequences generated by LFSRs. An IIR (infinite impulse response) filter is coupled in a feedback relationship with the summation combiner. Values generated by the IIR filter are combined together with the LFSR sequences to generate a pseudo-random number. The pseudo-random number is substantially uncorrelated to the LFSR sequences. And, when the pseudo-random number is used to encrypt an information signal to form an encrypted signal, the encrypted signal formed therefrom is correspondingly little-correlated to the LFSR sequences. The susceptibility of successful cryptanalysis of the encrypted signal is lessened as a result of the low level of correlation between the encrypted signal and the LFSR sequences, when having only access to fragments of the encrypted signal.

The values provided by the IIR, and combined with the LFSR sequences by the summation combiner, increase the complexity of the pseudo-random sequence. Such increased complexity reduces the correlation between the pseudo-random number generated therefrom and the LFSR sequences. When the pseudo-random number is used to encrypt an information signal, the added complexity provided to the pseudo-random number by use of the values generated by the IIR filter makes more difficult cryptanalysis of the encrypted signal by a party unauthorized to receive the signal.

In one implementation of an embodiment of the present invention, the IIR filter is formed of sections to permit the parallel generation of blocks of output symbols. Such symbols are utilized by the summation combiner together with bits of the LFSR sequences to form a pseudo-random number.

In these and other aspects, therefore, a pseudo-random number generator, and an associated method, generates a pseudo-random number. A summation combiner is coupled to receive a plurality of LFSR (linear feedback shift register) sequences in parallel. The summation combiner combines the LFSR sequences and forms the pseudo-random number responsive, in part, to combinations of the LFSR sequences. An infinite impulse response filter is coupled in a feedback connection with the summation combiner. The infinite impulse response filter generates impulse-response values for application to the summation combiner. The summation combiner further combines the impulse-response values together with the combinations of the LFSR sequences. And, the pseudo-random number formed by the summation combiner is further responsive to the impulse-response values.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 6 illustrates a method flow diagram listing the method steps of the method of an embodiment of the present invention for generating a pseudo-random number.

DETAILED DESCRIPTION

Figure 1:
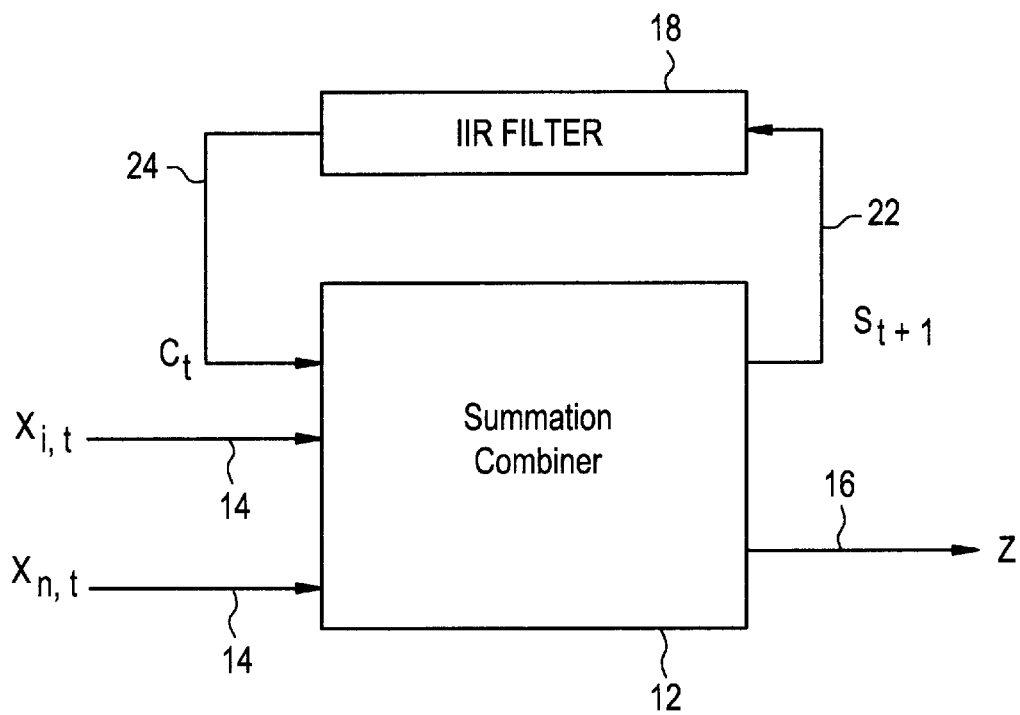
FIG. 1 illustrates a functional block diagram of a pseudo-random number generator of an embodiment of the present invention.

Referring first to FIG. 1, a pseudo-random number generator, shown generally at 10, is operable to generate a pseudo-random number. The pseudo-random number generator 10 shall be described with respect to an exemplary implementation in which the pseudo-random number is used in the formation of an encrypted signal. The generator 10 may, however, alternately be used in other implementations in which pseudo-random numbers are utilized.

The pseudo-random number generated by the generator 10 is substantially uncorrelated to combinations of input signals used in its formation. Thereby, decoding of the pseudo-random number, or an encrypted signal formed therefrom, by an unauthorized party through cryptanalysis is extremely difficult.

The pseudo-random number generator 10 includes a summation combiner 12 coupled to receive a plurality of periodic sequences, here on n lines 14. In the exemplary embodiment, the periodic sequences applied on the lines 14 to the summation combiner 12 are formed of LFSR (linear feedback shift register) sequences here represented by the designations $x_{i_t}$ through $x_{n_t}$.

The summation combiner 12 is operable to combine bits of the sequences applied thereto on the lines 14 and to generate a combined sequence, Z, on the line 16.

The pseudo-random number generator 10 further includes a logic circuit, here an IIR (infinite impulse response) filter 18 coupled in a feedback connection with the summation combiner 12. A feedback sequence formed of portions of the summed sequences generated by the summation combiner 12 are provided by way of the line 22 to the IIR filter 18. The feedback sequences are represented in the FIGURE by the designation $S_{t+1}$. And, the filter 18 is operable to generate a sequence, designated by $C_t$ on the line 24 which is coupled to an input to the summation combiner 12.

The sequences applied to the summation combiner on the line 24 are combined together with the LFSR sequences applied thereto on the lines 14 in successive sequences formed by the combiner 12. Such sequences form the pseudo-random number generated on the line 16. Because the feedback sequences applied to the summation combiner 12 on the line 24 are complex linear combinations of portions of the combinations of the LFSR sequences applied to the combiner 12 on the lines 14, the pseudo-random number generated on the line 16 is a complex linear combination of the input sequences. Thereby, the pseudo-random number generated by the generator 10 is less susceptible to cryptanalysis. And, when the pseudo-random number is combined with digital data to form an encrypted signal, the encrypted signal is similarly less susceptible to cryptanalysis. Security of communications in a radio, such as a cellular, communication system utilizing such encrypted signals is better assured.

FIG. 2 again illustrates the pseudo-random number generator 10. Again, the generator 10 is shown to include a summation combiner 12 and an IIR filter 18 connected in a feedback connection with the summation combiner by way of the lines 22 and 24. Here, LFSRs 32 are shown in connection with the lines 14. The LFSRs 32 contain, or generate, the pseudo-random sequences which are applied to the summation combiner to be combined thereat.

More particularly, the LFSR sequences generated on the lines 14 are coupled to input terminals of an adder circuit 36. The adder circuit 36 forms a portion of the summation combiner 12. The adder circuit 36 is operable to sum the sequences applied thereto and to generate a composite digital sequence on the line 38. The line 38 is connected to an input terminal of a divider circuit 44. The divider circuit is operable to divide the composite digital signal generated on the line 38 and provided thereto. The line 22 is connected to the divider circuit 44 to provide the feedback sequence to the IIR filter 18. And, the divided sequences formed by the divider circuit 44 form the pseudo-random number generated on the line 11. The FIGURE further illustrates a combiner circuit 46, representative of a circuit which combines a pseudo-random number with a digital data sequence, here provided to the combiner circuit 46 by way of the line 48, to form an encrypted digital sequence on the line 52.

Figure 2:
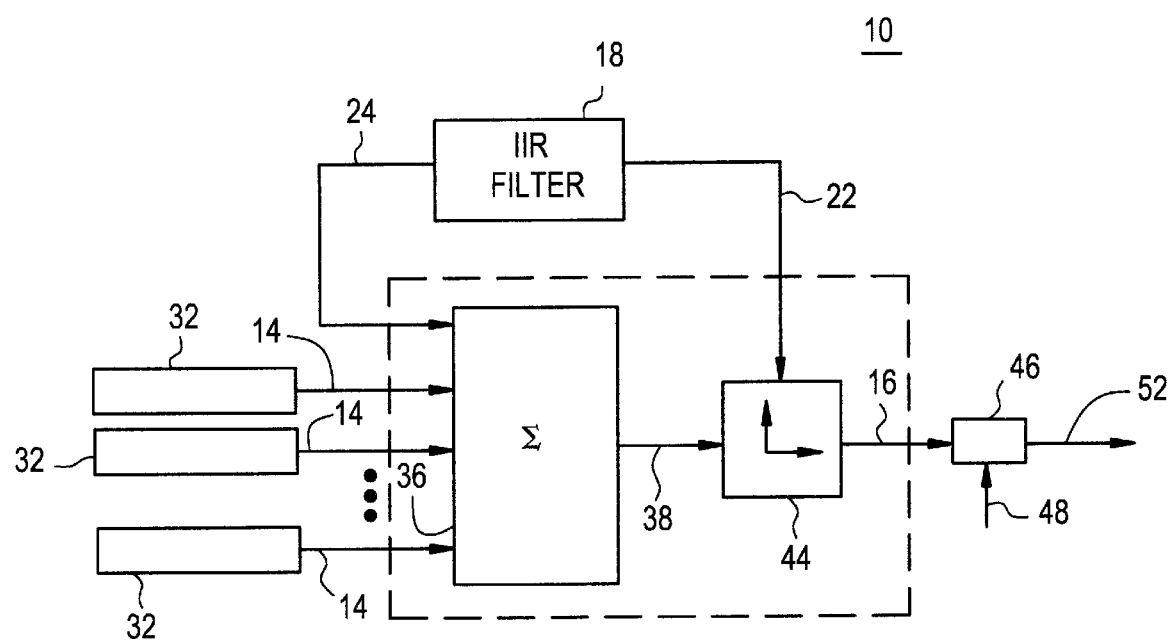
FIG. 2 illustrates a functional block diagram of the pseudo-random number generator, shown in FIG. 1, here further illustrating an exemplary implementation of the summation combiner which forms a portion of the pseudo-random number generator.

The exemplary implementation of the summation combiner 12, forming a portion of the pseudo-random number generator 10 shown in FIG. 2, corresponds to a combination device described in greater detail in U.S. Pat. No. 4,797,922. Additional details of the operation thereof are disclosed in such patent, and such disclosure is incorporated herein by reference.

Because of the feedback sequence generated on the line 24 by the IIR filter 18 is a complex linear combination of the input symbols summed together by the adder circuit 36 and divided by the divider circuit 12, the divided sequences formed by the divider circuit 44 and forming the pseudo-random number generated on the line 11 are less susceptible to cryptanalysis.

Figure 3:
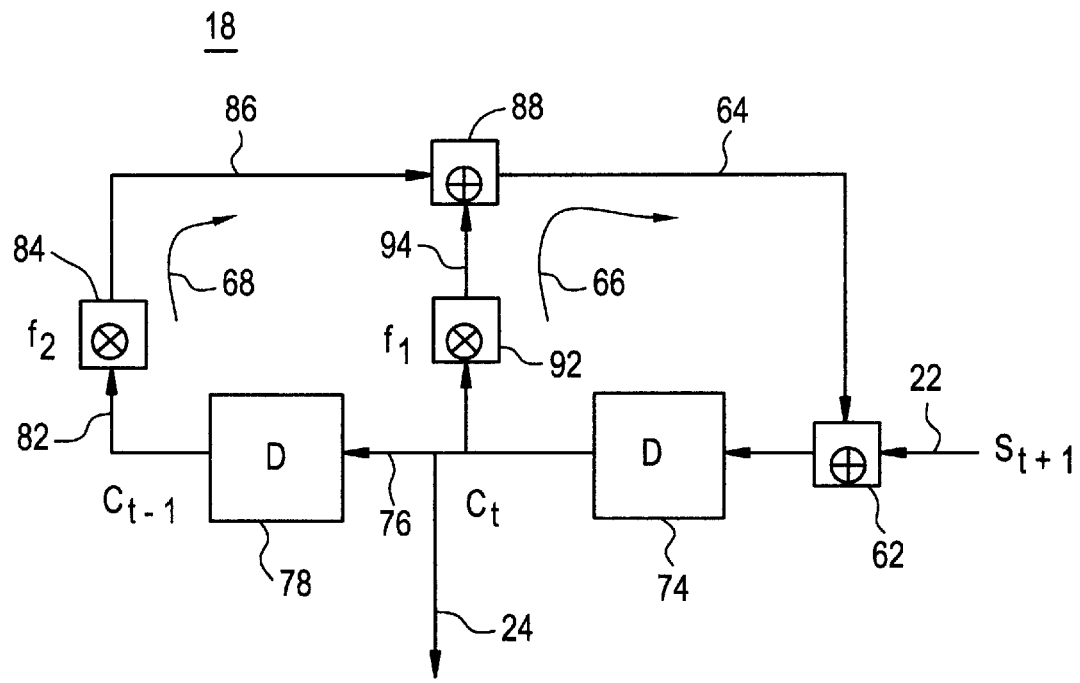
FIG. 3 illustrates a functional block diagram of an exemplary infinite impulse response filter which forms a portion of the pseudo-random number generator shown in FIGS. 1 and 2.

FIG. 3 illustrates an exemplary IIR filter 18 which forms a portion of the pseudo-random number generator 10. The illustrated filter is a second-order filter. In other embodiments, the filter is of other orders. Viz., the IIR filter 18 can be of any of n levels.

Again, the filter is shown to be connected to the lines 22 and 24 to receive sequences $S_{t+1}$ and to generate sequences $C_t$, respectively. The line 22 is coupled to a first input terminal of a summation element 62. A line 64, forming a portion of feedback paths 66 and 68 are coupled to second input terminals of the summing element 62. The summation element 62 generates a summed signal on the line 72 which is applied to a first delay element 74.

The first delay element delays the signal applied thereto and generates a first-delayed signal on the line 76. The line 24 is coupled to the line 76, i.e., the line 76 is "tapped", and the feedback sequence $C_t$ is formed therefrom.

The line 76 is also coupled to a second delay element 78. The second delay element 78 is operable, similar to the delay element 74 to introduce a second delay period upon the signal applied thereto and to generate a second-delayed signal, here designated by the sequence $C_{t-1}$ on the line 82. The line 82 is connected to an input terminal of a multiplier, or other scaling element, 84. The multiplier 84 is here shown to be of a scaling factor of $f_2$. The multiplier 84 generates a scaled value on the line 86 which is connected to a first input terminal of a summing element 88.

The line 76 is also connected to an input terminal of a multiplier, or other scaling element, 92. Here, the multiplier 92 exhibits a scaling factor of $f_1$ and is operable to generate a scaled value on the line 94 which is coupled to a second input terminal of the summation element 88. The summation element generates a summed value 64 which, as noted above, forms a portion of both the feedback paths 66 and 68.

As successive values are applied by way of the line 22 to the IIR filter 18, values generated on the line 24 are formed of combinations of both the input values as well as components formed through operation of the various feedback paths 66 and 68.

Figure 4:
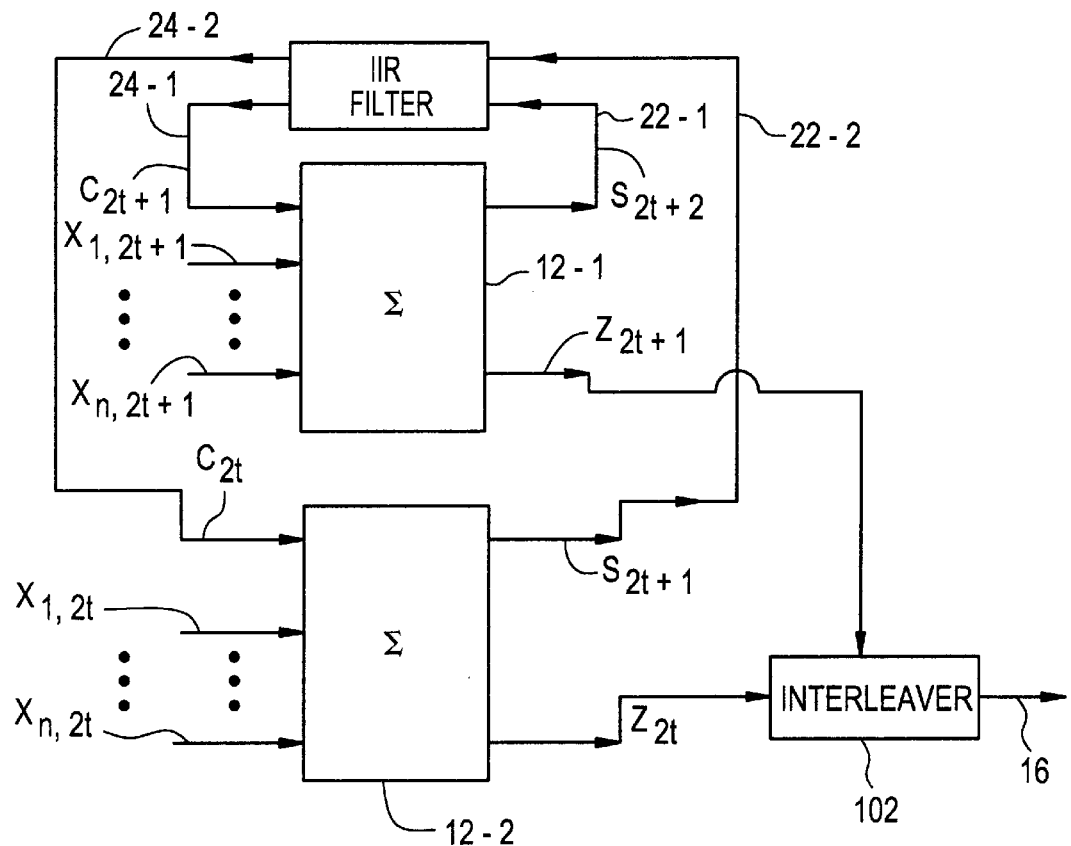
FIG. 4 illustrates a functional block diagram of portions of a pseudo-random number generator of another embodiment of the present invention.

FIG. 4 illustrates a pseudo-random number generator, also shown generally at 10, of another embodiment of the present invention. In this embodiment, the generator 10 includes two summation combiners 12, here designated by 12-1 and 12-2, each coupled to receive periodic sequences, here again LFSR sequences on the lines 14. In the exemplary embodiment illustrated in the FIGURE, the separate summation combiners 12-1 and 12-2 are connected to receive separate series of LFSR sequences.

The summation combiners are each coupled in a feedback arrangement with an IIR filter 18. Here, the first summation combiner 12-1 is connected to the IIR filter by way of the line 22-1, and the second summation combiner 12-2 is coupled to the IIR filter 18 by way of the line 22-2. Analogously, the lines 24-1 and 24-2 connect the summation combiners 12-1 and 12-2, respectively, with the IIR filter 18. The lines 24-1 and 24-2 are connected to separate tap locations, as shall be described below, of the IIR filter 18.

The embodiment of the pseudo-random number generator 10 shown in FIG. 4 advantageously doubles the number of symbols capable of generation during a particular time period, such as subsequent to each clock pulse by which the circuits are operable, in conventional manner of digital circuits. The summation combiners 12-1 and 12-2 are separately operable to generate pseudo-random number bit streams on the lines 16-1 and 16-2, respectively. The lines 16-1 and 16-2 are coupled to input terminals of an interleaver 102 which interleaves the symbols of the separate symbol streams and generates a combined, pseudo-random number bit stream on the line 16.

Utilizing the nomenclature shown in the FIGURE, a specific realization of the IIR filter 18 by which the IIR filter is implemented is derived in the following manner. The exemplary realization is derived by considering a finite field, i.e., a galois field, GF ($2^2$). A polynomial $X^2+X+1$ is defined in the finite field. A value, a, is defined to be a zero of the polynomial in GF($2^2$). Utilizing the scaling factor $f_2$ and $f_1$ of the multipliers 84 of the IIR filter 18 shown in FIG. 3, and making use of the properties of the zero, a, of the above polynomial, of $a^2=a+1$ in the finite field, values of symbols of the feedback sequence C, are as follows:

$$C_{t+1}=S_{t+1}+aC_t+a^2C_{t-1}$$

$$C_{2t+1}=S_{2t+1}+aC_{2t}+a^2C_{2t-1}$$

$$C_{2t+2}=S_{t2+2}+aC_{2t+1}+a^2C_{2t}$$

Rearranging terms of the second and third above-equations for $C_{2t+1}$ and $C_{2t+2}$ are as follows:

$$C_{2t+1}=S_{2t+1}+a(C_{2t}+aC_{2t+1})$$

$$C_{2t+2}=S_{2t+2}+a(C_{2t+1}+aC_{2t})$$

Figure 5:
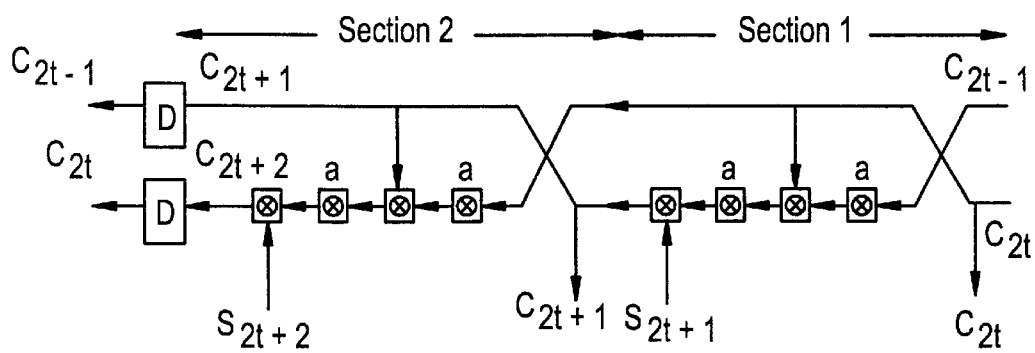
FIG. 5 illustrates an exemplary realization of an infinite impulse response filter forming a portion of the pseudo-random number generator shown in FIG. 4.

FIG. 5 illustrates a realization of the IIR filter 18 for the finite field of GF($2^2$). Lines 16-1 and 16-2 are illustrated in the FIGURE as taps taken from the separate sections, identified as Section 1 and Section 2 in the FIGURE. Lines 22-1 and 22-2 extending to the IIR filter 18 are similarly shown. Thereby, the IIR filter 18 is realized in a two-section implementation having parallelized generation of blocks of two output symbols. In turn, the pseudo-random number generator 10 of the embodiment shown in FIG. 4 is capable of generation of increased, by a factor of 2, number of symbols in a given time period.

FIG. 6 illustrates a method, shown generally at 112, of an embodiment of the present invention, for generating a pseudo-random number. The pseudo-random number generated by the method 112 exhibits a low correlation with input values used in its generation and, as a result, is less susceptible to cryptanalysis.

First, and as indicated by the block 114, first and at least second pseudo-random sequences are generated. Then, and as indicated by the block 116, the first and the at least second pseudo-random sequences are applied to a summation combiner. Then, and as indicated by the block 118, the first and the at least second pseudo-random sequences are combined, thereby to form multi-bit combined sequences.

Then, and as indicated by the block 122, at least one bit of the multi-bit combined sequences are provided to a logic circuit connected in a feedback connection with the summation combiner. The logic circuit to which the bits are applied includes at least one internal feedback element. Thereafter, and as indicated by the block 124, logical values are formed at the logic circuit responsive to the multi-bit combined sequences provided to the logic circuit. Then, and as indicated by the block 126, the logical values are applied to the summation combiner. And, as indicated by the block 128, the logical values and the first and the at least second pseudo-random sequences are combined together, and the logical values, once combined, form the pseudo-random number.

Thereby, through the use of an IIR filter, or other linear logic circuit having internal feedback therein, in a feedback connection with a summation combiner, a complex linear combination of input symbols is formed. The complex combination forming the pseudo-random number bit stream exhibits little correlation to input values used in the formation of the bit stream. Thereby, the pseudo-random number bit stream is less susceptible to cryptanalysis.

The previous descriptions are of preferred examples for implementing the invention, and the scope of the invention should not necessarily be limited by this description. The scope of the present invention is defined by the following claims.

What is claimed is:

1. A pseudo-random number generator for generating a pseudo-random number, said pseudo-random number generator comprising:

a summation combiner coupled to receive a plurality of at least pseudo-random sequences in parallel, said summation combiner for combining the pseudo-random sequences and for forming the pseudo-random number responsive, in part, to combinations of the pseudo-random sequences; and a logic circuit coupled in a feedback connection with said summation combiner, said logic circuit for generating logical values for application to said summation combiner, said logic circuit including at least one internal feedback element, the logical values formed by said logic circuit including components responsive to the at least one internal feedback element, said summation combiner further for combining the impulse-response values together with the combinations of the pseudo-random sequences, the pseudo-random number formed by said summation combiner further responsive to the logical values.

2. The pseudo-random number generator of claim 1 wherein said logic circuit comprises a filter circuit coupled in the feedback connection with the summation combiner.

3. The pseudo-random number generator of claim 2 wherein said filter circuit comprises an impulse response filter circuit.

4. The pseudo-random number generator of claim 3 wherein said impulse response filter circuit comprises an infinite impulse response filter circuit.

5. The pseudo-random number generator of claim 2 wherein said filter circuit comprises a first delay element and at least a second delay element coupled in series therewith, and wherein the at least one internal feedback element comprises a first feedback element, said first feedback element connected in parallel with said first delay element, thereby to form a first feedback path.

6. The pseudo-random number generator of claim 5 wherein said first internal feedback element comprises a first gain element.

7. The pseudo-random number generator of claim 5 wherein said at least one internal feedback element of said logic circuit further comprises a second feedback element, the logical values formed by said logic circuit including components responsive to said second feedback element.

8. The pseudo-random number generator of claim 7 wherein said second feedback element comprises a second gain element.

9. The pseudo-random number generator of claim 7 wherein said second feedback element is connected in parallel with said second delay element.

10. The pseudo-number generator of claim 9 further comprising a summing element coupled to said first internal feedback element to said second internal feedback element, and to said first delay element, said summing element for summing together values formed by said first and second internal feedback elements, respectively, and for providing summed values summed thereat to said first delay element.

11. The pseudo-random number generator of claim 1 wherein said pseudo-random sequences to which said summation combiner is coupled to receive comprise LFSR (linear feedback shift register) sequences.

12. A method for generating a pseudo-random number, said method comprising the steps of:

generating first and at least second pseudo-random sequences;

applying the first and the at least second pseudo-random sequences generated during said step of generating to a summation combiner;

combining together the first and the at least second pseudo-random sequences applied to the summation combiner during said step of applying the first and the at least second pseudo-random sequences, thereby to form multi-bit combined sequences;

providing at least one bit of the multi-bit combined sequences to a logic circuit connected in a feedback connection with the summation combiner, the logic circuit including at least one internal feedback element;

forming logical values at the logic circuit responsive to the multi-bit combined sequences provided to the logic circuit during said step of providing and portions of the multi-bit combined sequence feedback through the at least one internal feedback element;

applying the logical values formed during said step of forming to the summation combiner; and combining the logical values and the first and the at least second pseudo-random sequences together at the summation combiner, the logical values and the first and the at least second pseudo-random sequences, once combined, forming the pseudo-random number.

13. The method of claim 12 wherein the first and the at least second pseudo-random sequences applied during said step of applying the first and the at least second pseudo-random sequences are applied to the summation combiner substantially concurrently.

14. The method of claim 12 wherein said step of combining together the first and the at least second pseudo-random sequences applied to the summation combiner comprises adding together the first and the at least second pseudo-random sequences.

15. The method of claim 12 wherein said step of combining the logical values and the first and the at least second pseudo-random sequences together comprises adding the logical values and the first and the at least second pseudo-random sequences together.

16. The method of claim 12 wherein the logic circuit at which the logical values are formed includes a first delay element and at least a second delay element coupled in series therewith and wherein the at least one internal feedback element is connected in parallel with the first delay element.

17. The method of claim 12 wherein the logic circuit at which the logical values are formed comprises an infinite impulse response filter.

18. The method of claim 12 wherein said step of generating the first and the at least second pseudo-random sequences comprises generating first and at least second LFSR (linear feedback shift register) sequences.

* * * * *